(12) United States Patent
Leisenberg

(10) Patent No.: US 10,683,207 B2
(45) Date of Patent: Jun. 16, 2020

(54) METHOD FOR SINTERING CARBON BODIES IN A FURNACE

(71) Applicant: Wolfgang Leisenberg, Bad Nauheim (DE)

(72) Inventor: Wolfgang Leisenberg, Bad Nauheim (DE)

(*) Notice: Subject to any disclaimer, the term of this patent is extended or adjusted under 35 U.S.C. 154(b) by 219 days.

(21) Appl. No.: 15/737,521

(22) PCT Filed: Jun. 16, 2016

(86) PCT No.: PCT/EP2016/063826
§ 371 (c)(1),
(2) Date: Dec. 18, 2017

(87) PCT Pub. No.: WO2016/207050
PCT Pub. Date: Dec. 29, 2016

(65) Prior Publication Data
US 2018/0186646 A1    Jul. 5, 2018

(30) Foreign Application Priority Data

Jun. 23, 2015  (DE) .................. 10 2015 211 624
Dec. 3, 2015   (DE) .................. 10 2015 224 209

(51) Int. Cl.
*C01B 32/21*       (2017.01)
*F27B 9/24*        (2006.01)
(Continued)

(52) U.S. Cl.
CPC .............. *C01B 32/21* (2017.08); *C04B 35/52* (2013.01); *C04B 35/64* (2013.01); *F27B 9/022* (2013.01);
(Continued)

(58) Field of Classification Search
CPC . C01B 32/21; F27D 5/0068; F27D 2009/007; F27B 9/36; F27B 9/24;
(Continued)

(56) References Cited

U.S. PATENT DOCUMENTS 1,828,839 A * 10/1931 Hawke .................. F23M 5/085
                                                      110/343
3,112,181 A * 11/1963 Petersen ................. C10B 55/00
                                                      423/448
(Continued)

FOREIGN PATENT DOCUMENTS

WO         99/06779 A1    2/1999

OTHER PUBLICATIONS

The International Search Report and Written Opinion as dated Aug. 24, 2016, for International Application No. PCT/EP2016/063826.

*Primary Examiner* — Daniel C. McCracken
(74) *Attorney, Agent, or Firm* — Quarles & Brady LLP

(57) ABSTRACT

The invention relates to a method for sintering carbon bodies (16) in a furnace comprising at least a first furnace chamber (11) for receiving the carbon bodies, which are accommodated in a packing material (23), the carbon bodies being arranged between lateral chamber walls (12, 13, 21) of the furnace chamber, and the furnace chamber serving to form a preheating zone V, a heating zone H provided with a heating device, and a cooling zone A, wherein a packing material (23) made, at least in part, of a highly heat-conductive material is used.

15 Claims, 5 Drawing Sheets

Figure 1:
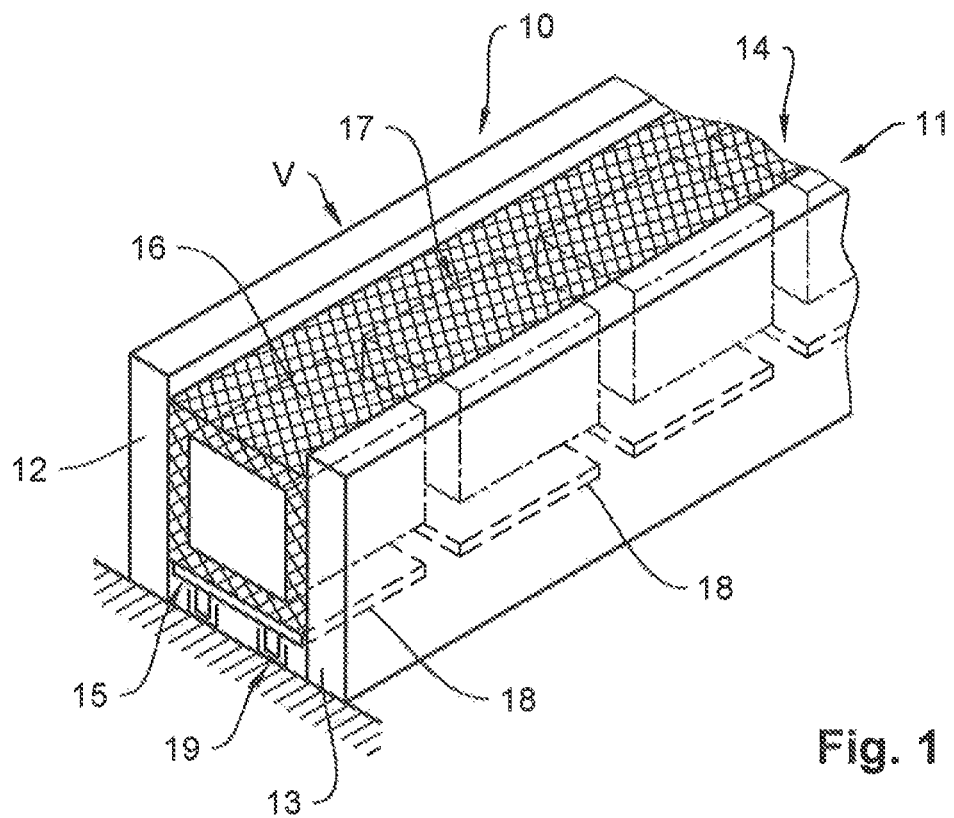

(51) Int. Cl.
*F27B 9/30* (2006.01)
*F27B 13/04* (2006.01)
*F27B 9/02* (2006.01)
*F27B 9/26* (2006.01)
*C04B 35/52* (2006.01)
*C04B 35/64* (2006.01)
*F27B 9/36* (2006.01)
*F27D 5/00* (2006.01)
*F27D 9/00* (2006.01)

(52) U.S. Cl.
CPC ............... *F27B 9/24* (2013.01); *F27B 9/243* (2013.01); *F27B 9/26* (2013.01); *F27B 9/3005* (2013.01); *F27B 9/36* (2013.01); *F27B 13/04* (2013.01); *F27D 5/0068* (2013.01); *F27D 2009/007* (2013.01)

(58) Field of Classification Search
CPC .......... F27B 13/04; F27B 9/3005; F27B 9/26; F27B 9/243; F27B 9/022; C04B 35/64; C04B 35/52
See application file for complete search history.

(56) References Cited

U.S. PATENT DOCUMENTS

| | | | | |
|---|---|---|---|---|
| 3,610,391 | A | * | 10/1971 | Beck ..................... B65G 35/00 198/562 |
| 4,569,835 | A | * | 2/1986 | Di Cio ................... C25C 3/125 264/29.1 |
| 4,847,021 | A | * | 7/1989 | Montgomery .......... C04B 35/52 264/29.3 |
| 6,042,801 | A | | 3/2000 | Linga et al. |
| 2015/0060297 | A1 | * | 3/2015 | Wei ........................... C25B 1/00 205/555 |

* cited by examiner

METHOD FOR SINTERING CARBON BODIES IN A FURNACE

The present invention relates to a method for sintering carbon bodies in a furnace comprising at least a first furnace chamber for receiving the carbon bodies, which are accommodated in a packing material, the carbon bodies being arranged between lateral chamber walls of the furnace chamber, and the furnace chamber serving to form a preheating zone, a heating zone provided with a heating device, and a cooling zone.

Methods of the kind mentioned above are implemented in different furnaces, the surely most common application of the method happening in so-called annular furnaces, in which the carbon bodies are arranged stationary in the furnace and the furnace is divided into a preheating zone, a heating zone, and a cooling zone by changing the arrangement of a mobile heating device, which is often referred to as a furnace fire, relative to a plurality of furnace chambers. The respective sections of the furnace chamber are periodically heated and cooled between room temperature and up to 1300° C.

The refractory material lining the furnace chambers has to be heated simultaneously in each case. Its significant mass adversely affects the energy balance of the annular furnace. Moreover, periodic heating and cooling takes a toll on the furnace body and leads to corresponding wear of the refractory material, necessitating replacement of the refractory material at intervals of about 7 to 10 years.

When arranged in the furnace chambers, the carbon bodies are embedded in a packing material, which is often made of calcined petroleum coke and which substantially has three distinct functions during the sintering to process, namely shielding against the ambient air as protection against oxidation, being permeable so as to allow for the dissipation of volatile components, in particular hydrocarbons, that escape from the carbon bodies during preheating in the preheating zone and especially transferring heat from the chamber walls of the furnace chamber to the carbon bodies.

The relatively poor heat conductivity of the packing material of about 0.3 W/mK causes a temperature drop of up to more than 100 Kelvin at the packing material. This limits the potential heat transfer and thus the furnace output and additionally deteriorates the energy efficiency of the annular furnace because of increased exhaust temperatures.

Furthermore, a furnace is known that allow a continuous sintering method, in which, such as is known from WO 99/06779, the carbon bodies, which are formed by green anodes in this case, are conveyed through a vertical furnace channel together with the packing material surrounding the carbon bodies. The carbon bodies are conveyed through the furnace channel by gravity, an anode column formed by a plurality of anodes being continuously lowered and the lowermost sintered anode being removed from the anode column and a green anode being subsequently added as the uppermost anode of the anode column. Given that the anodes in an anode column are arranged vertically, the packing material conveyed along has a substantially vertical arrangement as well.

In particular in the lower cooling zone downstream of the heating zone, the maximum compression of the packing material and the abrasive effect of the packing material, which usually consists of calcined coke, lead to increased wear of the surface of the channel wall, necessitating, in particular in the cooling zone, early replacement of the refractory material forming the channel walls.

Moreover, the vertical orientation of the furnace channel of the known furnace including the anodes stacked in an anode column leads to over-heating of the uppermost anodes in the preheating zone, necessitating additional cooling in order to set a desired anode temperature in the preheating zone, the additional cooling having an adverse effect on the energy efficiency of the continuous method.

Hence, the object of the invention is to propose a method that allows a furnace to be operated comparatively wear-free and energy-efficiently at the same time.

To attain this object, the method according to the invention has the features of claim 1.

According to the invention, a packing material that is made, at least in part, of a highly heat-conductive material is used.

The heat-conduction properties of a packing material formed of a highly heat-conductive material, which are substantially superior especially compared to calcined petroleum coke, lead to an improved energy balance of the method irrespective of the type of furnace employed.

Preferably, the packing material is made, at least in part, of a graphite material.

It is particularly advantageous if the packing material is made mainly of a graphite material.

Based on economic considerations, artificial graphite or artificial graphite granulate, either of which may also consist of graphitized petroleum coke, is a particularly suitable graphite material.

It is particularly advantageous to use material consisting of electrode residue of electrodes used in stainless-steel production, for example, as the graphite material, which is preferably granulated.

Compared to the continuous sintering method described above, it proves particularly advantageous if the carbon bodies are arranged in a line together with the packing material made, at least in part, of a graphite material and are conveyed horizontally through a furnace channel formed between the chamber walls of the furnace chamber in such a manner that the line of carbon bodies is successively conveyed through the preheating zone V, the heating zone H, and the cooling zone A.

In this way, the packing height of the packing material can substantially be limited to the height of the carbon bodies, thus avoiding the undesired compression effects described above. Moreover, heat conduction within the line of carbon bodies can be avoided by providing distance between the carbon bodies.

Owing to the sliding properties of the packing material made, at least in part, of a graphite material and conveyed together with the carbon bodies, which are substantially superior especially compared to the calcined petroleum coke usually used as the packing material, there are barely any abrasion effects due to the packing material at the surface of the furnace channel.

The method according to the invention allows achieving a substantial increase in energy efficiency even compared to the continuous sintering process described above if, parallel to and against the conveying direction of a first conveyor, a second conveyor conveys a second line of carbon bodies through a furnace channel of a second furnace chamber adjacent to the first furnace chamber, a furnace channel of the first furnace chamber being separated from the furnace channel of the second furnace chamber by a heat-transferring chamber wall in such a manner that a preheating zone of the first furnace chamber is arranged opposite a cooling zone of the second furnace chamber and heat is transferred between the cooling zone and the preheating zone via the chamber wall. In this way, heat is directly transferred between the carbon bodies arranged on the first conveyor and the carbon bodies arranged on the second conveyor via the packing material and the chamber wall.

In order to improve the heat transfer, it is advantageous if heat is transferred via a refractory material of the wall elements of the chamber wall, the ceramic mass of the refractory material containing silicon carbide or graphite.

It is particularly advantageous if heat is transferred via a highly heat-conductive material core accommodated in a refractory material shell within wall elements of the chamber wall.

Compared to a conventional chamber wall composed of refractory wall elements that exhibit significant heat resistance, the heat-conductive material core, which is preferably made of graphite, significantly reduces the heat resistance.

If a defined heat conductivity is set by a shape of the material core, the exact heat flow that will lead to the desired heating and cooling gradients between the hot and cold carbon bodies at the temperature difference predefined by the firing curve can be set in particular in combination with the material selected for the packing material.

If a heat transfer medium is circulated through flow channels formed in the wall elements so as to dissipate heat from the wall elements, the flow channels forming a preferably meandering channel in the chamber wall, it is possible to set the heat conductivity, i.e. the flow of heat in the wall, to a low furnace output and to dissipate excess heat via the heat transfer medium in the flow channel in case of higher outputs.

If air is used as the heat transfer medium, it is possible to feed the thus heated air as combustion air to the heating zone, for example.

Below, an embodiment of the method according to the invention and an embodiment of the furnace according to the invention are explained in more detail with reference to the drawing.

Figure 2:
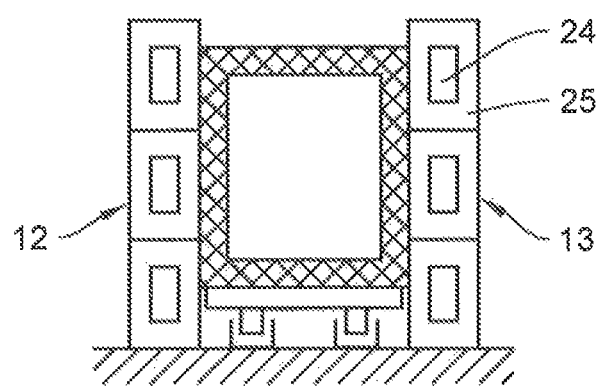
Figure 3:
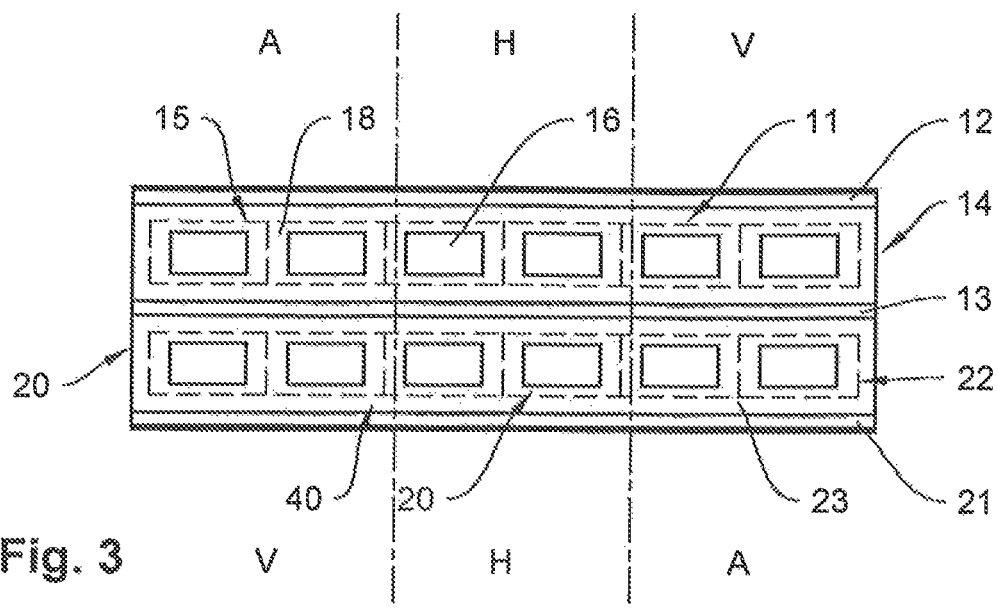
Figure 4:
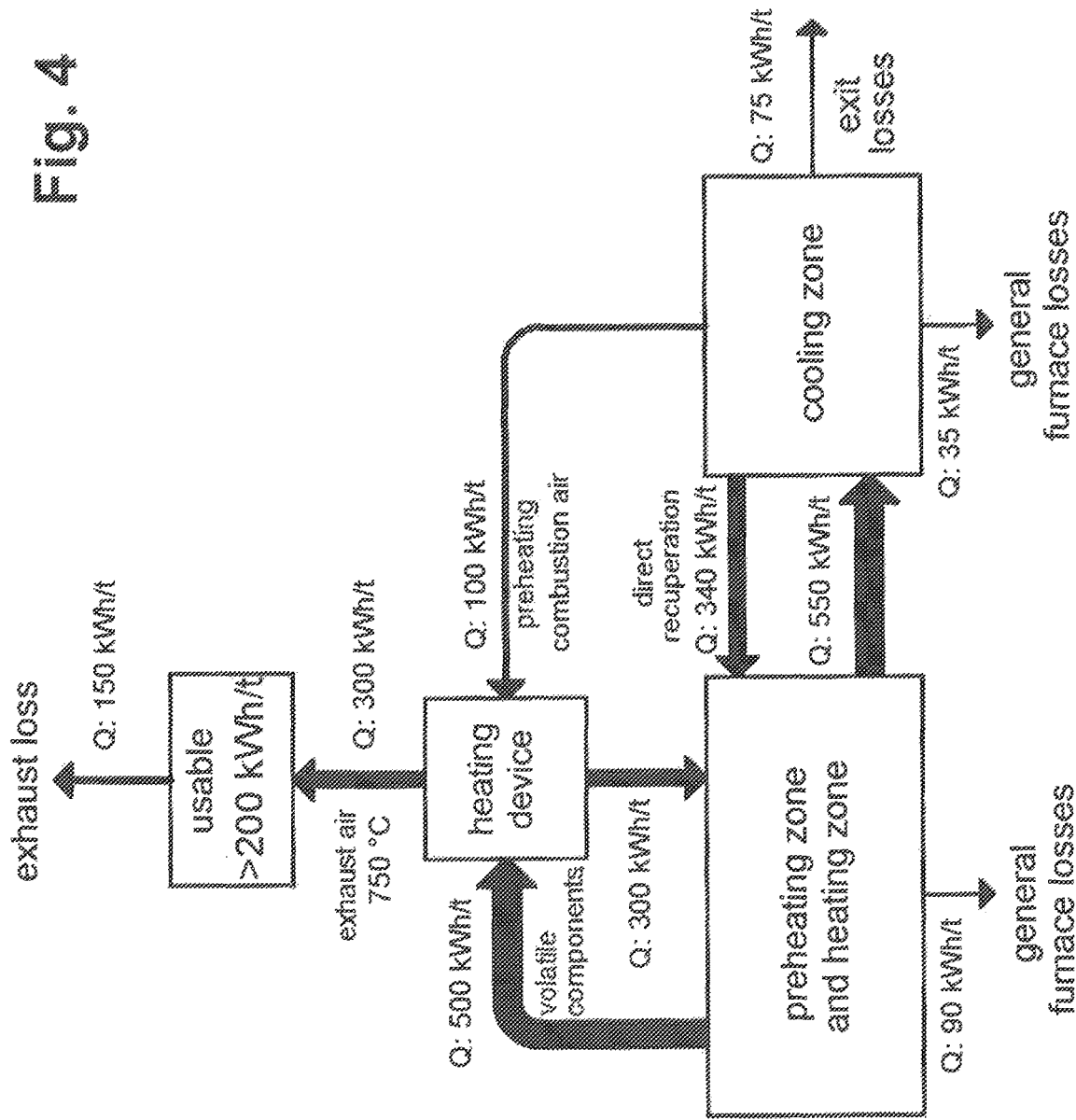
Figure 5:
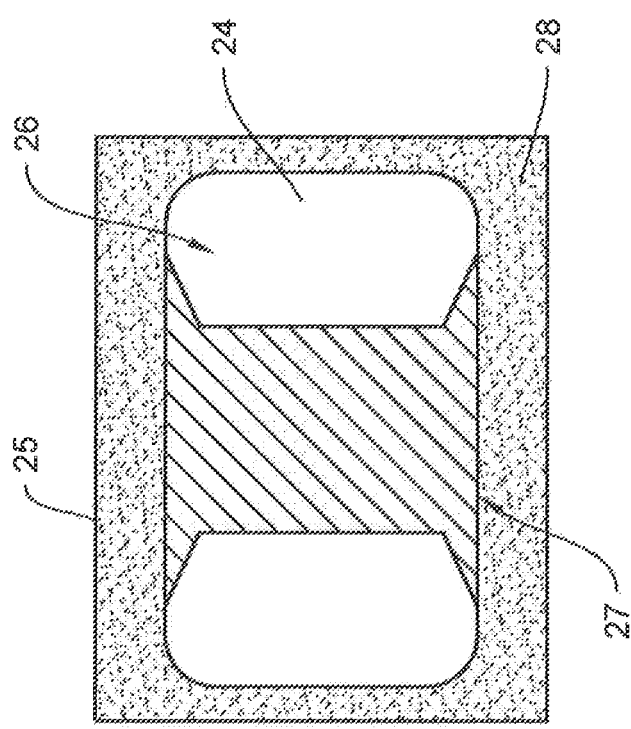
Figure 6:
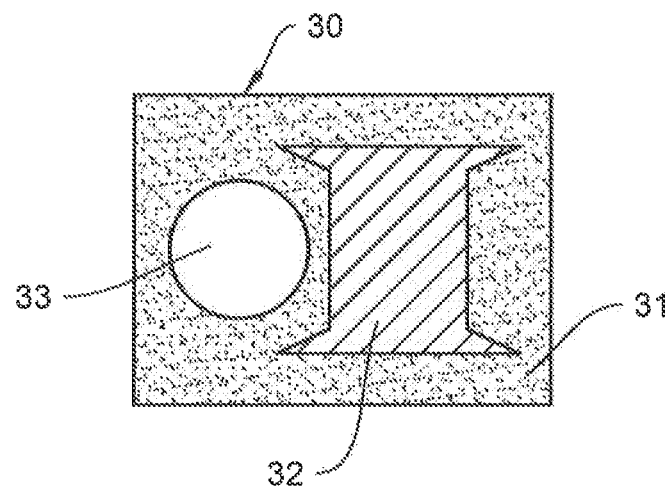
Figure 7:
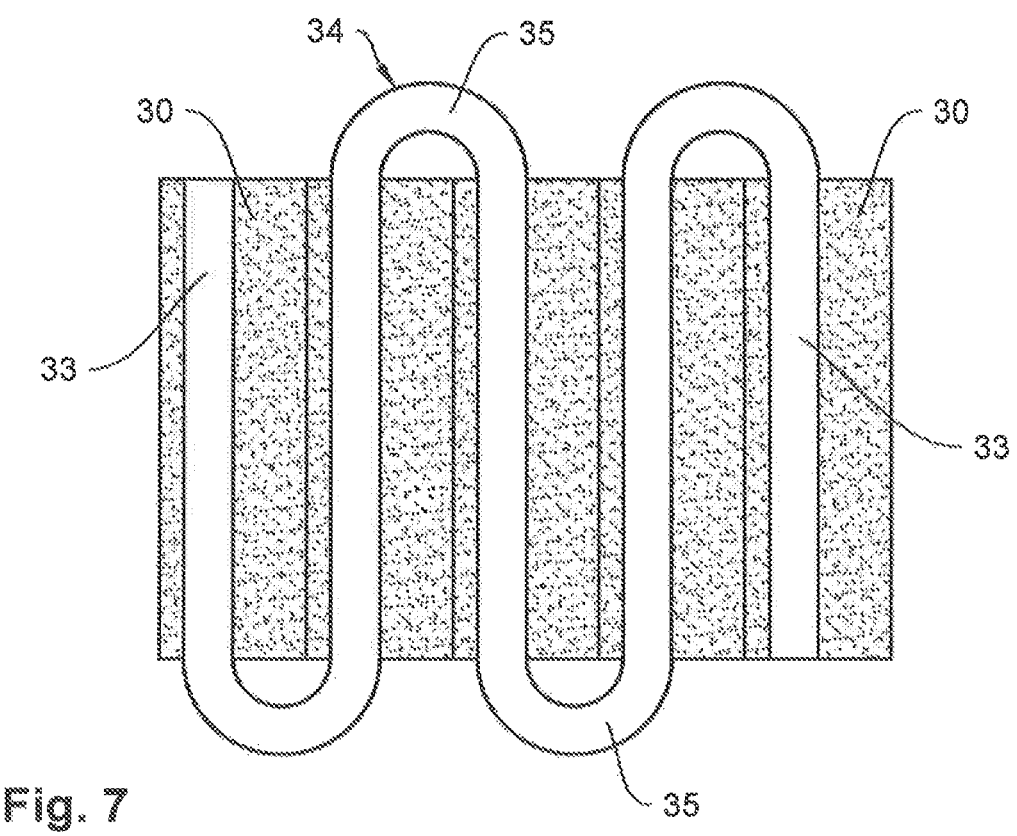

FIG. 1: shows an isometric view of part of a furnace;
FIG. 2: shows a cross-section view of the furnace illustrated in FIG. 1;
FIG. 3: shows a schematic view of a furnace configured as a counter-travel furnace;
FIG. 4: shows an illustration of an energy balance of a furnace operated as a counter-travel furnace;
FIG. 5: shows a wall element of a chamber wall;
FIG. 6: shows another embodiment of a wall element;
FIG. 7: shows a chamber wall composed of multiple wall elements.

FIG. 1 shows a section of a furnace channel 14 of a furnace 10 comprising a furnace chamber 11, whose lateral chamber walls 12, 13 form the furnace channel 14. The furnace chamber 11 has a chamber bottom formed by a conveyor 15, on which carbon bodies 16 are arranged in a line 17. In the case at hand, the conveyor 15 forming the chamber bottom is composed of a plurality of furnace cars 18, which are arranged one behind the other in the longitudinal direction of the furnace channel 14 and which form a chamber bottom surface that is substantially continuous in the longitudinal direction of the furnace channel 14 and each of which is guided in the furnace channel 14 in a rail guide 19 formed at the bottom for a longitudinal feed of the furnace car 18.

The illustration of the furnace 10 in FIG. 1 merely shows a longitudinal section of the furnace channel 14 of the furnace, said section being a preheating zone 20 of the furnace channel 14 in the case at hand, the furnace channel 14 being divided into a preheating zone V, a heating zone H, and a cooling zone A, as illustrated in FIG. 3 in a schematic view of a furnace 10 configured as a counter-travel device. As FIG. 3 further shows, the furnace 10 has another furnace channel 20 in addition to furnace channel 14, furnace channel 20 being formed in particular by the addition of another chamber wall 21 to chamber walls 12, 13, another furnace chamber 40 thus being formed. The second furnace channel 20 is provided with a conveyor 22, which is configured as a counter conveyor and allows feeding the furnace cars 18 against the conveying direction of the first conveyor 15. Both furnace channels 14 and 20 are provided with a heating device opposite each other, corresponding heating zones H thus being formed opposite each other.

Referring to the embodiment illustrated in FIG. 3, during operation of the furnace 10, the furnace cars 18 in furnace channel 14 are moved through furnace channel 14 from the right to the left, a starting section of furnace channel 14 thus forming the preheating zone V. Having passed the heating zone H, the carbon bodies 16 on the furnace cars 18 enter the cooling zone A and are ultimately conveyed out of the furnace channel 14. In furnace channel 20, which is parallel to furnace channel 14, the carbon bodies 16 are moved from the left to the right, which means that the preheating zone V of furnace channel 20 is formed opposite the cooling zone A of furnace channel 14 and that, having passed the heating zone H, the carbon bodies 16 enter the cooling zone A at the right-hand end of furnace channel 20.

Operation of the furnace 10 with conveyors 15 and 22 conveying in opposite directions and the resulting arrangement of cooling zones A and preheating zones V opposite each other has the effect that the temperature gradient due to operation in the opposite zones allows effective cooling and heating of the carbon bodies 16 without requiring an external energy supply.

The particular energy efficiency of the furnace 10 is additionally supported by the fact that, as the packing material 23, a packing material 23 that is made, at least in part, of a graphite material is used, which serves to accommodate the carbon bodies 16 and which, as is illustrated in particular in FIGS. 1 and 2, shields the carbon bodies 16 against the ambient air.

As shown in particular in FIG. 2, the packing material 23, which is in immediate contact with both the carbon bodies 16 and the surface of the chamber walls 12, 13, allows heat transfer by heat conduction, the particular heat conductivity of the packing material 23, which is up to three times the heat conductivity of petroleum coke depending on the amount of graphite material, allowing a particularly good heat transfer between the chamber walls 12, 13, which are provided with flow channels 24 for conducting heating gases, and the carbon bodies 16.

Using a material core 27 of isotropic graphite, the heat resistance of a wall element 25, which is illustrated in FIG. 5 and which has to have a thickness of about 400 mm for strength reasons, can essentially be reduced to the heat resistance of the ceramic shell.

In order to achieve a particularly good heat transfer between the heating gases flowing in the flow channels 24 of the chamber walls 12, 13 and the packing material 23, the chamber walls 12, 13 are composed of wall elements 25 in which the flow channels 24, as illustrated by way of example in FIG. 5, are formed by inserting a material core 27 made of graphite into a cavity 26 of the wall element 25, the material core 27 dividing the cavity 26 into the flow channels 24. Thus, the wall element 25 illustrated in FIG. 5 is substantially formed by a graphite body inserted into a shell 28 made of refractory material.

In this way, a very high recuperation rate of up to 80% is achieved. FIG. 4 shows, by quantity, the achievable energy balance of a furnace 10 operated with a packing material 23 formed by a graphite granulate and with a chamber wall composed of wall elements having a material core made of graphite. According to FIG. 4, heat recovery covers about 80% of the required heating energy, the heating device of the furnace being operated solely with volatile hydrocarbons from the carbon bodies as fuel. The outlet air temperature is high enough for it to also cover the heating energy for the carbon bodies 16, which may be formed by anodes, for example, i.e. for heating a kneading mixer, for example, which mixes the paste for the anodes, which consists of calcined coke and pitch. This means that the furnace does not require primary energy; it operates exothermically.

FIG. 6 shows a wall element 30 that has a graphite material core 32 made of graphite and embedded in a shell 31 made of a refractory material. The refractory material consists of a ceramic mass that contains silicon carbide and/or graphite for increasing its heat conductivity. A flow channel 33 is formed in the refractory material of the shell 31.

As shown in FIG. 7, multiple wall elements 30 arranged in a line can be combined to form a chamber wall in such a manner that the flow channels 33 of the individual wall elements 30 are connected to each other via bends 34 so as to form a meandering wall channel 34. Similarly to the flow channels 33, the bends, too, can be arranged in correspondingly formed wall elements, notwithstanding the simplified illustration of FIG. 7.

The invention claimed is:

1. A method for sintering carbon bodies in a furnace comprising at least a first furnace chamber forming a preheating zone V, a heating zone H provided with a heating device, and a cooling zone A,
    comprising the steps of: accommodating each of a plurality of carbon bodies in a packing material made, at least in part, of a heat-conductive material, and arranging the carbon bodies between lateral chamber walls of the furnace chamber such that the packing material is in direct contact with the carbon bodies and the surface of the lateral chamber walls.

2. The method according to claim 1, wherein the packing material is made, at least in part, of a graphite material.

3. The method according to claim 2, wherein the packing material is a graphite material.

4. The method according to claim 1, wherein the graphite material comprises an artificial graphite.

5. The method according to claim 4, wherein the artificial graphite is granulated.

6. The method according to claim 3, wherein the graphite material comprises graphitized petroleum coke.

7. The method according to claim 2, wherein the graphite material comprises a recycled material made of the residue of spent electrodes.

8. The method according to claim 1 further comprising the steps of arranging the carbon bodies accommodated in the packing material in a first line and conveying the carbon bodies horizontally on a first conveyor through a furnace channel formed between the chamber walls of the furnace chamber in such a manner that the line of carbon bodies is successively conveyed through the preheating zone V, the heating zone H and the cooling zone A.

9. The method according to claim 8, further comprising the step of conveying a second line of carbon bodies on a second conveyor parallel to and against the conveying direction of the first conveyor the second conveyor conveying the second line of carbon bodies horizontally through a furnace channel of a second furnace chamber adjacent to the first furnace chamber, wherein a furnace channel of the first furnace chamber is separated from the furnace channel of the second furnace chamber by a heat-transferring chamber wall in such a manner that a preheating zone V of the first furnace chamber is arranged opposite a cooling zone A of the second furnace chamber and heat is transferred between the cooling zone A and the preheating zone V via the chamber wall.

10. The method according to claim 1 wherein wall elements of the chamber wall comprise a refractory material whose ceramic mass contains silicon carbide or graphite, and wherein heat is transferred via the refractory material.

11. The method according to claim 1, wherein the chamber wall further comprises a heat-conductive material core accommodated in a shell made of refractory material within the wall elements of the chamber wall, and heat is transferred via the heat conductive material core.

12. The method according to claim 11, wherein the material core made of graphite.

13. The method according to claim 11, wherein a defined heat conductivity is set by the shape of the material core.

14. The method according to claim 1, wherein to dissipate heat from the wall elements, a heat transfer medium is circulated through flow channels formed in the wall elements, the flow channels forming a meandering wall channel in the chamber wall.

15. The method according to claim 14, wherein air is used as the heat transfer medium.

* * * * *

UNITED STATES PATENT AND TRADEMARK OFFICE
CERTIFICATE OF CORRECTION

PATENT NO. : 10,683,207 B2
APPLICATION NO. : 15/737521
DATED : June 16, 2020
INVENTOR(S) : Wolfgang Leisenberg Page 1 of 1

It is certified that error appears in the above-identified patent and that said Letters Patent is hereby corrected as shown below:

In the Specification

Column 1, Line 4, should be --CROSS-REFERENCE TO RELATED APPLICATIONS
This application represents the national stage entry of PCT International Application No. PCT/EP2016/063826 filed on June 16, 2016 and claims priority to German Patent Application No. 10 2015 211 624.7 filed on June 23, 2015, and German Patent Application No. 10 2015 224 209.9 filed on December 3, 2015. The contents of these applications are hereby incorporated by reference as if set forth in their entirety herein.--.

Column 1, Line 33, "sintering to process" should be --sintering process--.

Signed and Sealed this
Eighteenth Day of August, 2020

Andrei Iancu
*Director of the United States Patent and Trademark Office*